United States Patent [19]

Bortfeld et al.

[11] Patent Number: 4,660,430

[45] Date of Patent: Apr. 28, 1987

[54] COMBINATION GEAR-SELECTOR, SENSOR DEVICE

[75] Inventors: Harald Bortfeld, Hanover; Lutz Danne, Ronnenberg; Joachim Lehrmann, Lehrte; Alfred Klatt, Wathlingen, all of Fed. Rep. of Germany

[73] Assignee: WABCO Westinghouse Fahrzeugbremsen GmbH, Hanover, Fed. Rep. of Germany

[21] Appl. No.: 776,250

[22] Filed: Sep. 16, 1985

[30] Foreign Application Priority Data

Sep. 18, 1984 [DE] Fed. Rep. of Germany ....... 3434205

[51] Int. Cl.⁴ .................... G05G 9/12; B60K 20/00; H01H 9/06
[52] U.S. Cl. .................... 74/335; 74/473 R; 200/61.88; 335/206; 338/32 H
[58] Field of Search ............ 74/335, 473 R; 335/206; 338/32 R, 32 H; 200/61.88, 61.91

[56] References Cited

U.S. PATENT DOCUMENTS

| 4,022,078 | 5/1977 | Malott | 200/61.88 X |
| 4,199,747 | 4/1980 | Miller | 200/61.88 X |
| 4,380,938 | 4/1983 | Olson | 74/473 R |
| 4,519,266 | 5/1985 | Reinecke | 335/206 X |

FOREIGN PATENT DOCUMENTS 2107279 4/1983 United Kingdom .

Primary Examiner—Allan D. Herrmann
Attorney, Agent, or Firm—G. E. Hawranko

[57] ABSTRACT

A combination gear-selector, sensor device for use with vehicle transmissions having a plurality of gear positions and certain special gear functions and being controlled by an electronic circuit includes a shift lever having a first, square magnet which, when moved over distinct gear position sensors, indicates selection of a certain gear. A rod coaxially disposed within the shift lever has a second, rectangular magnet, displaced to one side of the first magnet, which when vertically moved over a first function sensor, indicates selection of that function which can be to skip a gear. A coaxial tube surrounds the rod member within the shift lever and has a third, rectangular magnet, displaced to an opposite side of the first magnet, which can be moved over a second function sensor to indicate selection of a second special function. The three magnet elements are oriented in an adjacent but opposing polarity relation and the sensors are polarity sensitive to prevent inadvertent indication by the wrong magnet, sensor arrangement. The special functions can only be selected in an active gear position due to the rectangular shape of the second and third magnets.

18 Claims, 3 Drawing Figures 4,660,430

COMBINATION GEAR-SELECTOR, SENSOR DEVICE

BACKGROUND OF THE INVENTION

This invention relates to a combined gear-selector, sensor device for use with vehicle transmissions requiring precise, reliable sensing of the selected gear position for an extended period of time. This gear-selector, sensor device is particularly advantageous to vehicle transmissions utilizing a shift pattern having only gear positions which are: the home position; an upshift position; a downshift position; and a neutral position. Such a shift pattern, in contrast to the widely-used H-pattern, which requires extensive manipulation to achieve the desired gear position, has as an inherent advantage, an efficiency of operation which arises out of the reduced manipulation required in shifting to the desired gear position.

One gearshift position transmitter, using the above-described four-position pattern, can be found in the British Patent GB 2,107,279 which discloses that in the upshift and downshift positions, electronic logic independently selects the most suitable next higher or lower gear. This transmitter also provides that in the neutral position, the neutral gear is engaged and that the shift lever moves back to the home position by an elastic force after the selection of either the upshift or downshift position. Additionally, a gearshift preconditioning device, designed for the same type of transmission scheme, can be found in U.S. patent application Ser. No. 763,741, assigned to the assignee of the present invention. In this system, the neutral position within the vehicle transmission is preconditioned such that movement between the number of possible neutral gear positions is reduced. For the previously-mentioned disclosures, the electronic logic must recognize the current positions of the shift lever, preferably by means of a contactless sensing arrangement, so that wear of the sensing components does not affect the longevity of reliable operation. One such disclosure of a contactless sensing arrangement, found in U.S. Pat. No. 4,519,266 and assigned to the assignee of the present invention, is designed to apply to an H-shift pattern; and, accordingly, requires a complex arrangement of magnetic-field-sensitive sensors which are sampled according to a predetermined system operating sequence.

A further requirement of the gear-selector, sensor device is the transmission of operational requests in addition to the previously-detailed four gear positions that can be selected. Some service vehicles often have a split group of gears which is used to double the number of possible gear positions. Some types of activations can be provided on the gearshift lever to effect such an operational request for the split-position function. An example of such a gearshift lever, found in U.S. Pat. No. 4,380,938 and assigned to the assignee of the present invention, discloses a combined range valve and splitter valve formed as a part of the gearshift handle for accomplishing the multiple gear functions necessary for some service vehicles. Another advantageous feature of the gearshift lever is the provision of a second switch on the lever; which, at the initiation of the driver, instructs the electronic logic to skip one or more gears, thereby saving fuel in an empty or partly-loaded vehicle.

The electronic logic, which typically generates the ultimate control signals for the vehicle transmission once the request has been generated by the driver through manipulation of the gearshift lever, relies on operational sequencing in the form of instructions. One problem associated with such electronic logic arrangements has been the misinterpretation of one requested gear position for another through some fault in the sensor arrangement and/or transmission of the selected gear position.

It is also desirous of such gear-selector, sensor devices to be able to prevent a special gear function, such as, the gear-skip or split position operation, from being activated while in the neutral position. Additionally, selection of the neutral gear position once one of these special functions has been initiated, should not have an affect on the electronic logic arrangement, such as, cancellation of such request.

SUMMARY OF THE INVENTION

It is, therefore, an object of the invention to provide a combination gear-selector, sensor device which provides for contactless sensing of a selected one gear position from a reduced number of possible gear positions.

It is a further object of the invention to provide such a gear-selector, sensor device which senses additional operating functions besides the gear-position selection in a simple and reliable manner.

It is an even further object of the invention to provide such a gear-selector, sensor device which provides a distinct sensor output for each possible gear-selector position and provides such a distinct sensor output in a non-coded format.

It is yet a further object of the invention to provide such a gear-selector, sensor device which provides an output signal capable of indicating in a simple and reliable manner that an error in reading the requested gear position has occurred at an electronic logic circuit.

Still a further object of the invention is to provide such a gear-selector, sensor device which utilizes a plurality of magnetic field elements which represent a specific gear-selecting function and an array of individual sensor elements including at least one polarity-sensitive sensor associated with each magnetic element.

An even further object of the invention is to provide such a gear-selector, sensor device in which a plurality of magnetic field elements are connected to the gear-selector lever and move in conjunction with the gear-selecting lever simultaneously.

Yet a further object of the invention is to provide such a gear-selector, sensor device in which the plurality of magnetic field elements are arranged such that adjacent magnetic field elements exhibit opposite polarity magnetic field characteristics.

Briefly, the invention consists of a gearshift lever movable to one of four gear-selecting positions and one of two gear-operating positions, whereby the movement required to select a desired position or operation is kept to a minimum by use of a ball-and-socket arrangement.

The four possible gear positions are: home, upshift, downshift, and neutral; the two operating positions are: gear skip and split positions. A gear-skip element and a split-position switch are included on the gearshift lever and serve to operate tubular control arms and angled vane configurations associated with these operating functions. Magnetic field elements are secured to each of the magnetic vanes associated with the gear positions and gear-operating functions. A third angled vane and a third magnetic field element are secured to the shift lever arm and is associated with the request for the one of the possible four gear positions. A sensing plate is disposed directly adjacent and beneath the number of magnetic field elements. The sensing plate has disposed therein a plurality of sensing elements corresponding in number to the number of gear positions and the special operating functions. The polar orientation of the magnetic field elements and the spacing of the magnetic field elements in relation to the sensing elements is selected to preclude inadvertent sensing by one sensing element of the magnetic field element not associated therewith.

DESCRIPTION AND OPERATION

Figure 1:
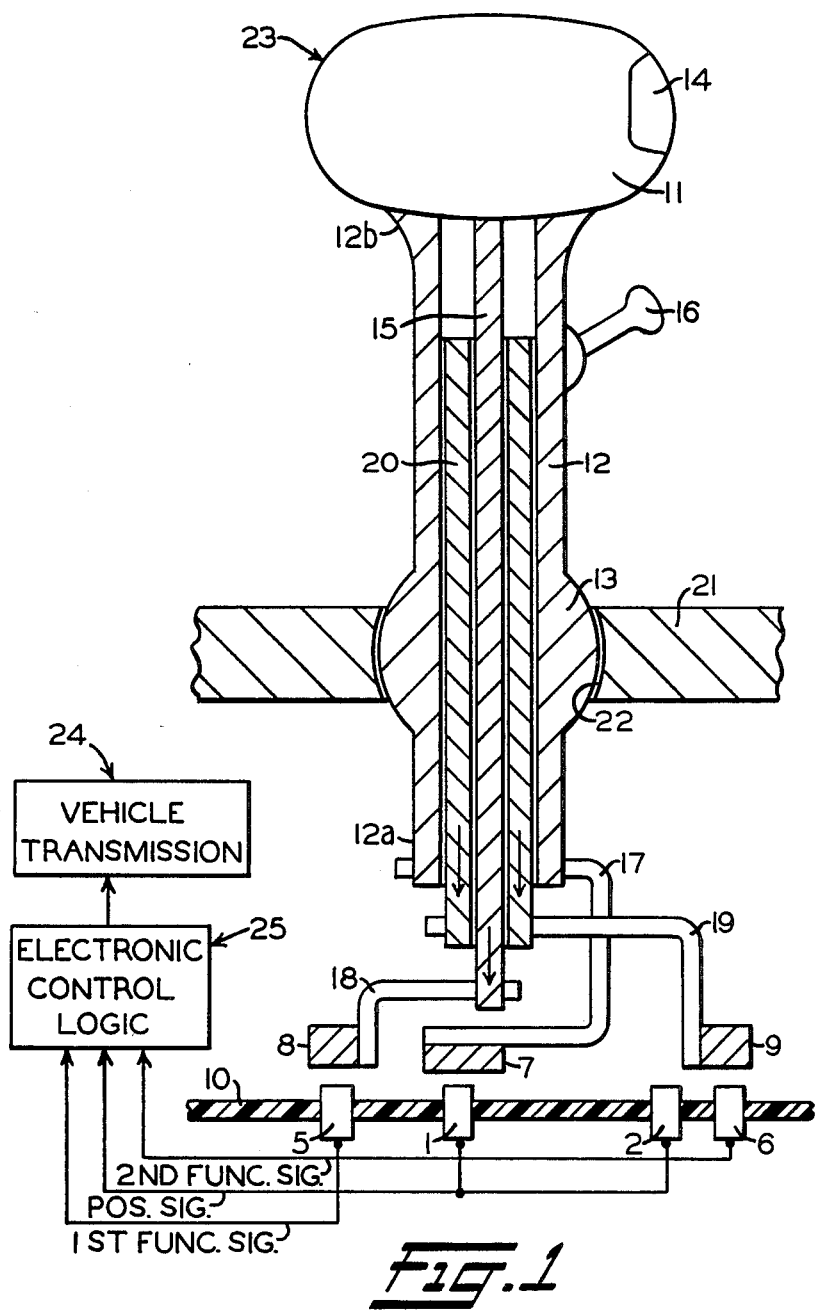
FIG. 1 is an elevational view, in section, of a combined gear-selector, sensor device constructed in accordance with the invention.

As seen in FIG. 1, the combined gear-selector, sensor device 1 includes a gear-selector arm 12 which is movable within a shift lever housing 21. A socket 22, formed within the shift lever housing 21, cooperatively engages a ball portion 13, formed on the gear-selector arm 12 such that the gear-selector lever 23 can be pivotally-moved to any one of a plurality of gearshift positions as well as gear-operating positions. The shift pattern to which this combined gear-selector, sensor device 1 is primarily directed includes a four-positioned gearshift pattern consisting of a sensor or home position (H), an upshift position (U), a downshift position (D) symmetrically-opposite the upshift position (U), and a neutral position (N) disposed in a sideways, spaced-apart relation to the home position and at an angle between the upshift (U) and downshift (D) positions. The home position (H), the upshift position (U), and the downshift position (D) are all linearly-disposed; whereas, the neutral position (N) is linearly-disposed only relative to the home position (H) and on a line perpendicular to that on which the home (H), upshift (U), and downshift (D) positions are located. A spring or other type of elastic arrangement (not shown) can be secured to the gear-selector arm 12 to return the gear-selector arm 12 to the home position (H) following operation of the gear-selector, sensor device 1 to one of the gear-selector positions.

A first magnetic field element 7 is connected to the bottom portion 12a of gear-selector arm 12 by way of a first angled vane 17 which is somewhat U-shaped such that the first magnetic element 7 can be positioned substantially beneath and in the same vertical plane as the bottom portion 12a of the gear-selector arm 12. This first magnetic element 7 provides for the sensing of the four gear positions (H, U, D, N) by working in conjunction with four distinct magnetic sensing elements 1, 2, 3 and 4, better illustrated as to the relative geometric layout in FIG. 2. As further illustrated in FIG. 2, the four magnetic sensing elements 1 through 4 are each assigned one of the four gear positions in the following manner: the first magnetic sensing 1 senses when the gear-selector arm 12 is in the home position (H); the second magnetic sensing element 2 senses the neutral position (N); the third magnetic sensing element 3 senses the upshift position (U); and the fourth magnetic sensing element 4 senses the downshift position (D).

The bottom portion 12a of the gear-selector arm 12 is illustrated having a smaller length than is actually the case. This bottom portion 12a requires a longer than shown length to prevent the magnetic attraction between the first magnetic element 7 and the four magnetic sensing elements 1 through 4 from negatively affecting movement of the gear-selector arm 12.

A sensor plate 10 is provided beneath and in close proximity to the first magnetic element 7 in addition to second and third magnetic elements 8 and 9 which are disposed adjacent the first magnetic element 7 on opposing sides and raised slightly higher than the first magnetic element 7 with respect to the horizontal plane on which the sensing plate 10 is disposed. Associated with the second and third magnetic elements 8 and 9 are fifth and sixth magnetic sensing elements 5 and 6 also disposed on the sensor plate 10 and corresponding to transmission-operating functions as will be described hereinafter in further detail.

The second magnetic element 8 is associated with a gear-operating function whereby the vehicle transmission 24 can be instructed by the vehicle operator to skip a gear; which function can provide the advantage of rapid optimum gear selection when the change in speed of the vehicle is at a greater than typical level. A skip control element 14, which is typically a pushbutton, is connected to the gear-selector arm 12 by being formed as part of a gear-selector knob 11 diposed at the upper portion 12b of the gear-selector arm 12. The activation of the skip control element 14 results in a downward, vertical movement of a central rod 15 on which is attached, at the bottom portion thereof, a second angled vane 18. This downward movement of the central rod 15 is effected by way of an activating arrangement (shown generally at 26 in FIG. 3) disposed within the gear-selecting knob 11; such activating arrangement being shown as a spring-return actuator 26a contacting a cam element 26b secured to central rod 15, but which can be any type of horizontal to vertical movement converter as is commonly used in the mechanical arts. At the lowest extension of central rod 15, the second magnetic element 8 is sufficiently proximate to the fifth magnetic sensing element 5 to detect the selection of this gear-operating function. Additionally, by the second magnetic element 8 being disposed slightly higher than the first magnetic element 7, in the upward-extended position of the central rod 15, sufficient space exists between the fifth magnetic sensing element 5 and a second magnetic element 8 to prevent a false sensing of this function when the gear-selecting arm 12 is operated to one of the possible gear positions.

Figure 2:
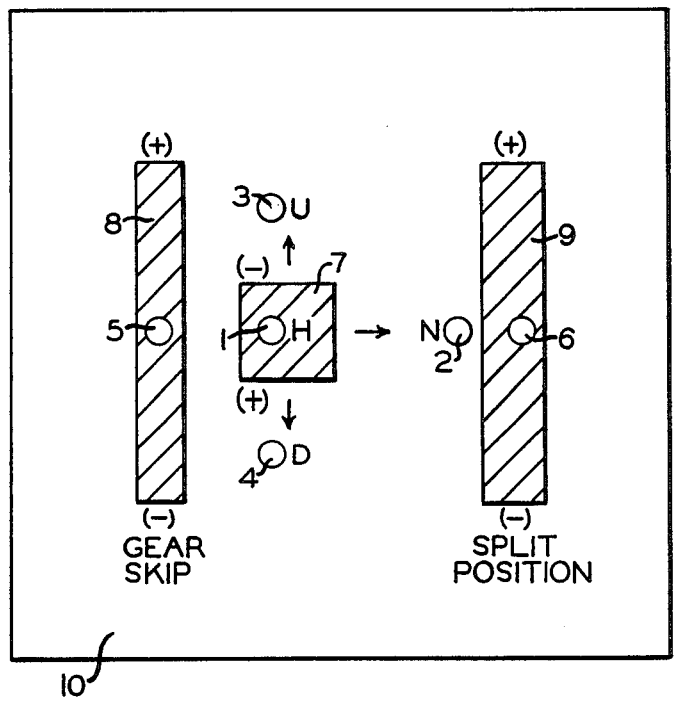
FIG. 2 is a top plan view of the sensing arrangement and shift pattern for the combined gear-selector, sensor device shown in FIG. 1.

As shown in FIG. 2, the second magnetic element 8 is of an elongated shape, whereas the first magnetic element 7 is essentially square in shape and is substantially wider at the base than the upright, rectangularly-shaped second magnetic element 8. The respective polarities of the first and second magnetic elements 8 and 9 are directly opposite as is also shown in FIG. 2; the purpose of this distinction as well as the shape distinction as will be explained hereinafter in further detail. In addition to the gear-skip function, a split position function can be achieved by means of a split control element which can be a split switch 16 which is shown in the form of a lever and extends from the gear-selector arm 12, but which can be accomplished by mechanical activation from another position as well. The split switch 16 is connected to the coaxial tube 20 in a conventional manner such that, the coaxial tube 20 can be raised or lowered by the operation of the split switch 16.

Figure 3:
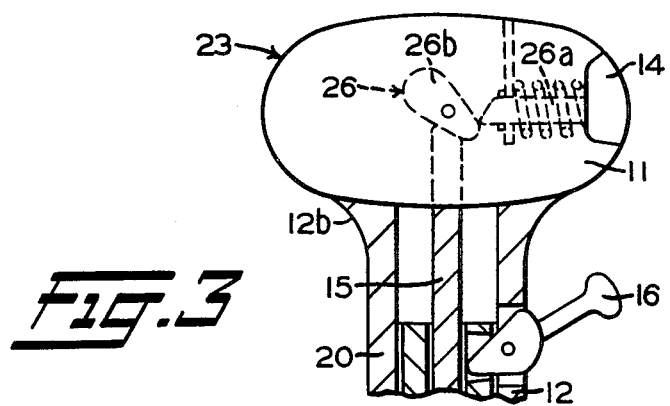
FIG. 3 is an elevational view, in section, of a gear-selector knob, actuator arrangement constructed in accordance with the invention.

Activation of split switch 16 results in vertical movement of a coaxial tube 20 which coaxially-surrounds the central rod 15 within the gear-selector arm 12; such activation shown generally as 27 in FIG. 3, where a cam lobe 27a fits into a slot 27b in the coaxial tube 20. Secured to the bottom end of the coaxial tube 20 is a third angled vane 19 which, similar to the second angled vane 18, is L-shaped and has an elongated third magnetic element 9 secured thereto. The split switch 16 is engaged when it is desired to extend the number of possible gear positions obtainable by the vehicle transmission 24 which, in most common transmission application, serves to double the number of gear positions.

As seen in FIG. 2, the relation of the length of the elongated second and third magnetic elements 8 and 9 to the gearshift pattern allows that both the gear-skip and split position functions can be achieved in either the upshift or downshift positions selected by the vehicle operator. This can be seen by moving the gear-selector arm 12 such that the first magnetic element 7 now sits over the third or upshift sensor 3. Additionally, the bottom portion or negative pole (−) of the second magnetic element 8 would also still reside above the fifth or gear-skip sensor 5 such that activation of the gear-skip element 14 could still result in the gear-skip function being achieved.

As further seen in FIG. 2, placement of the neutral or second magnetic sensing element 2 in a nonaligned manner with the upshift (U), downshift (D), and home (H) gear positions provides the protection of preventing engagement of either the gear-skip or split position functions when the neutral gear position has been selected. This is so because, as the first magnetic element 7 resides over the second sensing element 2, the second and third magnetic elements 8 and 9 are shifted out of the over-top alignment with the fifth and sixth sensing elements 5 and 6, respectively.

As further illustrated in FIG. 2, the three magnetic elements 7, 8 and 9 are oriented in an opposing-polarity manner such that the activation of any one sensing element cannot occur as a result of the proximity of another magnetic element; as can occur, for instance, when the second magnetic element 8 is brought into proximity to the gear position sensors 1, 3 and 4 by a sideway-shift into the neutral position (N). Polarity-sensitive sensing elements, such as, for example, Hall effect elements or magnetic field sensitive resistances, can be used to achieve this protection.

In operation, the vehicle operator manipulates the gear-selector lever 23 to the desired position which, in this instance, will be assumed to be the upshift position (U). As seen in FIG. 2, the first magnetic element 7 will now reside over the upshift or third sensing element 3 and the third sensing element 3 will now be read or sampled by an electronic control logic 25 which will act on the request In this position, if it is desired by the operator to go from one gear to a gear two levels higher, the gear-skip element 14 is operated and the central rod 15 is moved downward toward the fifth sensing element 5 which then results in electronic control logic 25 receiving this request and acting accordingly. The split position function can also be requested at this time by activation of the split switch 16 which moves the coaxial tube 20 downward, resulting in a pick-up of this sensed request by the electronic control logic 25. If the gear-selector lever 23 is moved sideways to achieve a neutral gear position (N), the second and third magnetic elements 8 and 9 are moved sideways as well, and the gear-skip and split position sensors 5 and 6 cannot be activated in this mode. An elastic or return arrangement (not shown) serves to return the gear-selector lever 23 to the original home position (H).

If, after previously selecting either the gear-skip or split position function, it is desired to go to the neutral position (N), either the second or third magnetic element 8 or 9 will be moved away from the fifth and sixth sensors 5 and 6. The electronic control logic 25 must be programmed to ensure that the activated split-group function remains in the vehicle transmission even in this neutral position. Furthermore, the electronic control logic 25 must be developed in such a way that the previous position remains engaged until a new position—as read by activation of one of the first four sensing elements—is reliably recognized.

Although the hereinabove form of the invention constitutes a preferred embodiment, it can be appreciated that modifications can be made thereto without departing from the scope of the invention as detailed in the appended claims.

Having now described the invention, what we claim as new and desire to secure by Letters Patent, is:

1. A combination gear-selector, sensor device for use with vehicle transmissions operable to a plurality of gear positions and at least one special gear function and controlled by an electronic control circuit, said gear-selector, sensor device comprising:
   (a) a shift lever pivotably movable within a shift housing;
   (b) a first magnet element connected to said shift lever and movable with said shift lever such that, a gear select indication is generated in response to operation of said shift lever to one of the plurality of gearshift positions;
   (c) a plurality of gear select sensors disposed adjacent and in a spaced-apart relation to said first magnet element, said gear select sensors corresponding in number to the plurality of gear positions such that, each of said gear select sensors outputs a distinct position signal readable by the electronic control circuit;
   (d) first function selecting means operably-connected to said shift lever for selecting a first one of the at least one special gear function upon actuation of a first function controller, said first function selecting means including a second magnet element disposed to one side of said first magnet element and oriented in an opposing polarity relation to said first magnet element; and
   (e) a first gear function sensor disposed adjacent and in a spaced-apart relation to said first function selecting means, said first gear function sensor being disposed such that, as said second magnet element is brought within a predetermined proximity thereto, a first function signal is output therefrom which is readable by the electronic control circuit.

2. A combination gear-selector, sensor device, as set forth in claim 1, further comprising a second function selecting means operably-connected to said shift lever for selecting a second one of the at least one special gear function upon actuation of a second function controller, said second function selecting means including a third magnet element disposed at another side of said first magnet element and oriented in an opposing polarity relation to said first magnet element, and a second gear function sensor disposed adjacent and in a spaced-apart relation to said second function selecting means, said second gear function sensor being disposed such that, as said third magnet element is brought within a predetermined proximity thereto, a second function signal is output therefrom which is readable by the electronic logic control.

3. A combination gear-selector, sensor device, as set forth in claim 1, wherein said first magnet element is essentially square-shaped and said plurality of gear select sensors include a neutral gear select sensor which is disposed sideways and in a spaced-apart relation to at least two other linearly disposed gear select sensors.

4. A combination gear-selector, sensor device, as set forth in claim 3, wherein said second magnet element is essentially rectangular in shape, the height of which is at least equal to the distance between said at least two other linearly-disposed gear select sensors such that, such first one of the at least one special gear function can be selected in any of the active gear positions.

5. A combination gear-selector, sensor device, as set forth in claim 1, wherein said gear select sensors and said first gear function sensor are disposed adjacent one another and are polar-sensitive such that, an output of such first function signal is prevented upon movement of said first magnet element proximate to said first gear function sensor and an output of such distinct position signals is prevented upon movement of said second magnet element proximate to said plurality of gear select sensors.

6. A combination gear-selector, sensor device, as set forth in claim 2, further comprising a rod member coaxially disposed within said shift lever, said rod member being cooperatively-engaged on one end to said first function controller and on the opposite end to said second magnetic element, said rod member being vertically-movable such that said second magnet element can be positioned to indicate selection of such first one of the at least one special gear function.

7. A combination gear-selector, sensor device, as set forth in claim 6, further comprising a coaxial tube disposed within said shift lever and in surrounding coaxial relation to said rod member, said coaxial tube being cooperatively-engaged on one end to said second function controller and on the opposite end to said third magnet element, said coaxial tube being vertically-movable such that, said third magnet element can be positioned to indicate selection of such second one of the at least one special gear function.

8. A combination gear-selector, sensor device, as set forth in claim 7, wherein said first function controller is a pushbutton disposed on a gearshift knob secured to a top end of said shift lever.

9. A combination gear-selector, sensor device, as set forth in claim 8, wherein said second function controller is a switch lever disposed on said shift lever.

10. A combination gear-selector, sensor device, as set forth in claim 2, wherein said gear select sensors are disposed intermediate said first gear function sensor and said second gear function sensor and wherein said gear select sensors are oriented in an opposing polar relation to said first and second gear function sensors.

11. A combination gear-selector, sensor device, as set forth in claim 7, wherein said first magnet element is essentially square-shaped and said plurality of gear position sensors include a neutral gear position sensor which is disposed sideways and in a spaced-apart relation to at least two linearly disposed gear select sensors.

12. A combination gear-selector, sensor device, as set forth in claim 11, wherein said second and third magnet elements are essentially rectangular in shape, the heights of which are substantially equivalent and are at least equal to the distance between said linearly disposed gear select sensors such that, such first and second ones of the at least one special gear function can be selected in any of the active gear positions.

13. A combination gear-selector, sensor device, as set forth in claim 2, wherein said gear select sensors and said first and second gear function sensors are disposed on a common sensor plate.

14. A combination gear-selector, sensor device, as set forth in claim 13, wherein said common sensor plate is disposed horizontal with respect to a common plane on which the first, second, and third magnet elements can be disposed, said second and third magnet elements being vertically-movable away from such common plane to achieve a disengaged condition of the first and second one of the at least one special gear function respectively.

15. A combination gear-selector, sensor device, as set forth in claim 7, wherein said first function selecting means includes a first vane member connected on one end to said rod member and having disposed on the opposite end thereof, said second magnet element, said first vane element extending below and away from said shift lever in a first direction such that said second magnet element is displaced from said first and third magnet elements to prevent interference therebetween.

16. A combination gear-selector, sensor device, as set forth in claim 15, wherein said second function selecting means includes a second vane member connected on one end to said coaxial tube and having disposed on the opposite end thereof, said third magnet element, said second vane element extending below and away from said shift lever in a second direction opposite said first direction such that said third magnet element is displaced from said first and second magnet elements to prevent interference therebetween.

17. A combination gear-selector, sensor device, as set forth in claim 16, wherein said first, second, and third magnet elements are rigidly-connected to said shift lever, said first vane member, and said second vane member respectively, such that operation of said shift lever effects simultaneous and substantially equivalent movement of said first, second, and third magnet elements.

18. A combination gear-selector, sensor device, as set forth in claim 2, further comprising a ball and socket arrangement between said shift lever and said shift housing respectively disposed such that, said shift lever is pivotably movable thereby.

* * * * *